United States Patent Office 2,793,105
Patented May 21, 1957

---

2,793,105

GRINDING WHEELS

Frank J. Lection, Springfield, Mass., assignor to Monsanto Chemical Company, St. Louis, Mo., a corporation of Delaware No Drawing. Application August 6, 1954,
Serial No. 448,370

4 Claims. (Cl. 51—298)

This invention relates to thermosetting binders for grinding wheels and to the grinding wheels made therewith. More particularly the invention relates to phenolic type binders modified with polyvinyl acetal resins.

Resin bonded grinding wheels are used quite extensively for many grinding operations in which ceramic bonded wheels are of little value. The resin bonded wheels generally comprise abrasive grits bonded with a thermosetting resin such as phenolic, melamine, urea, etc. resins. One objection to these materials as bonding medium for the abrasive grits is the brittleness of the bond which causes a relatively rapid deterioration of the grinding wheel made therewith.

Efforts have been made to decrease the brittleness of the thermosetting bond by mixing a thermoplastic resin with the thermosetting resin while the latter is still in the fusible state. Among the more successful thermoplastic additives have been the polyvinyl acetal resins and particularly the polyvinyl butyral resins. However, difficulties have been encountered in the use of such mixtures because of insufficient flow during the molding operation, segregation of polyvinyl butyral in the resin matrix, and because of loss in flexural strength of the grinding wheels due to the addition of the thermoplastic resin.

One object of this invention is to provide grinding wheels made with a phenolic-polyvinyl acetal resin bond and having improved flexural strength and greater uniformity in the cured piece (i. e. no soft spots).

A further object is to modify phenolic-polyvinyl butyral resin bonding media to improve the flow thereof in the molding operation.

These and other objects are attained by reacting monomeric styrene with a phenol under acid conditions, immediately thereafter reacting the product with formaldehyde to form a fusible resin and then admixing the product with a polyvinyl acetal resin and forming grinding wheels from the mixture.

The following examples are given in illustration and are not intended as limitations on the scope of this invention. Where parts are mentioned they are parts by weight.

EXAMPLE I

Mix together 100 parts of phenol, 15 parts of styrene, 4 parts of oxalic acid and 1.5 parts of boric acid. Heat the mixture under reflux at 160–175° C. with constant agitation for about 1.5 hours. Then add 68 parts of formalin (37% formaldehyde) over a period of about 1.5 hours while maintaining refluxing conditions. The temperature during this step will fall to about 100° C. due to the presence of the water in the formalin. Continue refluxing the reaction medium after the final addition of formalin until the reaction medium contains 0.5% or less of free formaldehyde. Then dehydrate the reaction medium under vacuum to obtain a solid brittle resin. For purposes of further description this will be called Resin A.

Resin A is a fusible thermoplastic material since it is prepared with a deficiency of formaldehyde, i. e., less than 1 mol of formaldehyde per mol of phenol. To make it thermosetting, it should be blended with a hardening agent such as hexamethylene tetramine, paraformaldehyde, etc. This blending is generally done in the dry condition.

To form the grinding wheels of this invention, Resin A is blended in the dry pulverulent form with the hardening agent and a polyvinyl acetal resin. This blend is then further modified by the incorporation therein of a filler such as cryolite, abrasive grains such as aluminum oxide grits, and a liquid material such as a liquid phenolic resin, furfural, etc. which acts as a lubricant and wetting agent for the abrasive grains. The blended materials are then pressed in a proper mold at 1000 p. s. i. and cured for three days at temperatures rising slowly from room temperature to 175° C.

A representative formula for the grinding wheel blend is as follows:

| | Parts |
|---|---|
| Resin A | 100 |
| Polyvinyl butyral resin | 15 |
| Hexamethylene tetramine | 10 |
| Wetting agent | 45 |
| Filler | 70 |
| Abrasive grains | 1400 |

Grinding wheels prepared from the formula shown above are exceptionally uniform and when broken apart it was observed that the resin had flowed completely and evenly during the curing operation.

In order to check the flow properties of Resin A alone and admixed with the polyvinyl acetal resin and to compare Resin A with a similar resin made from phenol and formaldehyde without the styrene, melting point and oven flow tests may be used.

For comparison, prepare a resin by mixing together 100 parts of phenol, 72 parts of formalin and 2 parts of oxalic acid. Heat the mixture at reflux temperature until less than 0.5% free formaldehyde can be detected and then dehydrate the reaction medium under vacuum to obtain a dry brittle resin. Pulverize the resin. This resin is called Resin B in the following tables.

The melting point of the resins is tested by placing the powdered resin on a standard melting point bar. The oven flow test is performed as follows: Form a pill from a measured amount of powdered resin in a standard tableting machine, heat the pill for 3 minutes at 125° C. on a flat movable surface in a horizontal position, then tip the surface to an angle 65° from the horizontal and continue heating the surface and pill at 125° C. for 17 minutes. The amount that the resin flows is measured in millimeters.

The results of tests on Resins A and B blended with 10 parts of hexamethylene per 100 parts of resin and with and without 15 parts of polyvinyl butyral resin are shown in Table I.

*Table I*

| Resin | Polyvinl Butyral | Melting Point, °C. | Oven Flow, mm. |
|---|---|---|---|
| A | No | 81 | 88–90 |
| B | No | 100 | 19 |
| A | Yes | 84 | 16 |
| B | Yes | 107 | None |

The figures in Table I show that the addition of the polyvinyl butyral resin increases the melting point of both Resin A and Resin B and decreases the oven flow of A to 16 mm. and of Resin B to such an extent that no flow occurs. Thus the combination of Resin A and the polyvinyl butyral resin still has substantial flow and better strength properties necessary to the preparation of good grinding wheels.

It would be expected that the lower melting point of Resin A and its greater flow properties would result in grinding wheels having decreased flexural strength. Since it is difficult to measure accurately the flexural strength of materials in the form of a wheel, prepare bars 6"x1"x1" from the formulations shown in Table I and test them by the general method described in ASTM D790–49T using a 4 inch span and a cross-head speed of 0.05 inch/min. It will be found that the mean flexural strength of Resin A and Resin B, each modified with 10 parts of hexamethylene tetramine is about the same, i. e. 4,137 p. s. i. and 4,341 p. s. i. respectively. However when these resins are each modified with 15 parts of polyvinyl butyral resin, it is found that the mean flexural strength of the formulation containing Resin A is about 3,744 p. s. i. whereas the mean flexural strength of the formulation containing Resin B is 2,961 p. s. i. This difference represents more than a 20% loss in flexural strength if resins of the type of Resin B are used.

The resins of this invention are prepared by reacting styrene with a monohydric phenol under acid conditions and immediately after completion of said reaction condensing the product with less than one mol of formaldehyde for each mol of phenol. The condensation reaction is continued until substantially all of the formaldehyde is chemically combined. The resin thus produced is recovered and dry blended with a hardener and a polyvinyl acetal resin.

The amount of styrene may vary from 0.1 to 0.2 mol per mol of phenol. The styrene may be replaced in whole or in part by ring-substituted styrene such as mono- and polychlorostyrenes, mono- and polyalkyl styrenes especially the methyl styrenes.

As a matter of convenience in describing the invention, the resins and the formulations are based on 1 mol of phenol. The phenol may be substituted in whole or in part by cresols or xylenols.

The catalyst for the reaction between the styrene and the phenol and the subsequent reaction with formaldehyde should be an acid or mixture of acids. Preferably a mixture of oxalic acid and boric acid is used in an amount varying between 4 and 8 parts of total acid per 100 parts of phenolic component. Other acids such as sulfuric, hydrochloric, formic, acetic, etc. acids may be used.

The reaction between the styrene and phenolic components is carried out at temperatures from 150–200° C. and the reaction is continued to completion. For styrene and phenol this generally takes from 1 to 2 hours.

Immediately after completion of the reaction between the styrene and phenolic components from 0.7 to 0.9 mol of formaldehyde in the form of an aqueous solution should be added to the hot reaction medium. The addition of the formaldehyde should take place over a period of from 1–4 hours. Since the reaction is maintained under reflux conditions, the water in the formaldehyde solution causes an immediate reduction in temperature to about 100° C. After all the formaldehyde has been added the reaction under reflux conditions should be continued until substantially all of the formaldehyde has been chemically combined. At this point the desired resin has been formed and is recoverd from the reaction medium by dehydration, preferably under vacuum. The product is a solid brittle resin that can be easily pulverized. The resin is permanently thermoplastic. To render it thermosetting, it must be mixed or blended with a hardening agent such as hexamethylene tetramine, or the solid polymers of formaldehyde such as paraform. From 6 to 12 parts of hardening agent are necessary for each 100 parts of resin.

To formulate the grinding wheel binders of this invention, 100 parts of the pulverized resin are mixed with from 10 to 20 parts of a polyvinyl acetal resin and the requisite amount of hardening agent. The pulverized resin should be blended in the dry state with the solid hardening agent and the polyvinyl acetal resin in pulverulent form. The most useful polyvinyl acetal resin is the polyvinyl butyral resin made by reacting butyraldehyde with a hydrolyzed polyvinyl ester containing from 0–5% residual ester groups. The resin will contain from 15–25% residual hydroxyl groups and the balance will be butyraldehyde acetal groups. Polyvinyl acetals made from formaldehyde, acetaldehyde and propionaldehyde or mixtures thereof may be used to replace the polyvinyl butyral in whole or in part.

To form the grinding wheels, the resin blend is further mixed with abrasive grains and a filler. From 5 to 15 parts of resin blend are used for each 100 parts of abrasive grains and from 40 to 60 parts of filler are used for each 100 parts of resin blend. The abrasive grains may be any of the well-known hard inorganic materials such as aluminum oxide grit, sand, silicon carbide, etc. The filler should be a mineral somewhat softer than the abrasive grits, such as cryolite.

After thorough blending of the grains, filler and resin mixture, the grinding wheel is formed by molding under heat and pressure. The usual practice is to form the wheel under relatively high pressure of 1000 p. s. i. or over and then to heat the formed wheel in the absence of pressure under gradually rising temperture conditions until the resin is cured. The heat and pressure may and in some cases preferably are applied simultaneously.

It is advantageous in forming grinding wheels from dry ingredients to use a liquid wetting agent to help promote uniform distribution of the dry resin bond and to yield a more uniform product. Liquid phenolic resins, furfural, and other liquid materials may be used for this purpose.

What is claimed is:

1. A grinding wheel comprising abrasive grits bonded with a blend of from 10 to 20 parts by weight of a polyvinyl acetal resin, 100 parts of a phenolic resin prepared by reacting 0.1–0.2 mol of a styrene with 1 mol of a monohydric phenol under acid conditions followed immediately by reaction of the product with 0.7–0.9 mol of formaldehyde and from 6–12 parts of a hardening agent for the phenolic resin.

2. A grinding wheel as in claim 1 wherein the polyvinyl acetal resin is a polyvinyl butyral resin.

3. A grinding wheel bonding agent comprising a blend of from 10 to 20 parts by weight of a polyvinyl acetal resin, 100 parts of a phenolic resin prepared by reacting 0.1–0.2 mol of a styrene with 1 mol of a monohydric phenol under acid conditions followed immediately by reaction with 0.7–0.9 mol of formaldehyde and from 6–12 parts of a hardening agent for the phenolic resin.

4. A grinding wheel bonding agent as in claim 3 wherein the polyvinyl acetal resin is a polyvinyl butyral resin.

References Cited in the file of this patent

UNITED STATES PATENTS

| | | |
|---|---|---|
| 2,387,831 | Cogan et al. | Oct. 30, 1945 |
| 2,395,594 | May | Mar. 5, 1946 |
| 2,416,182 | Kistler | Feb. 18, 1947 |
| 2,602,076 | Teot | July 1, 1952 |